DISPLAY SYSTEM WITH INTENSIFICATION
Filed Nov. 2, 1964
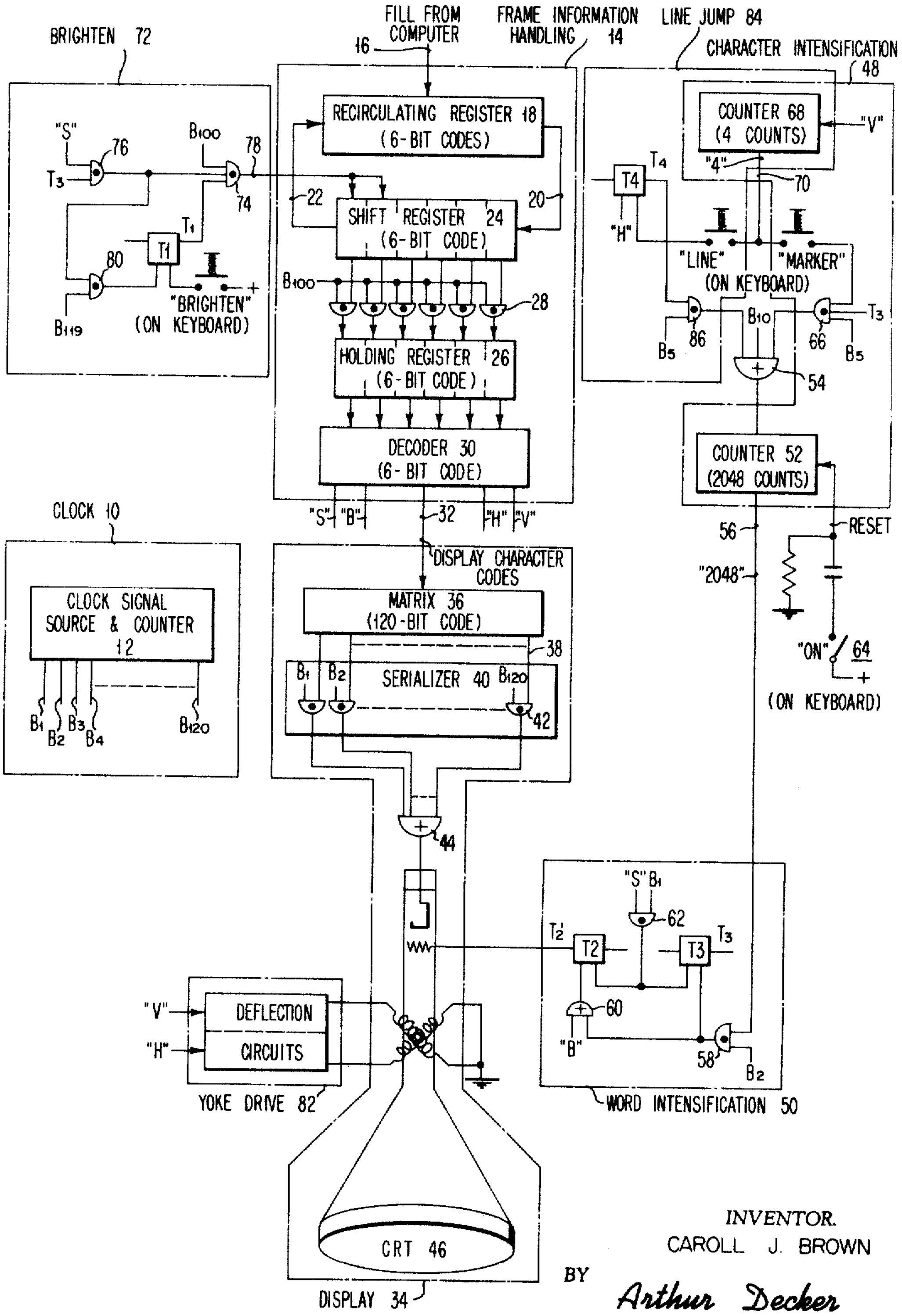
INVENTOR.
CAROLL J. BROWN
BY Arthur Decker
ATTORNEY United States Patent Office 3,336,587
Patented Aug. 15, 1967

3,336,587
DISPLAY SYSTEM WITH INTENSIFICATION
Caroll J. Brown, San Jose, Calif., assignor to International Business Machines Corporation, New York, N.Y., a corporation of New York
Filed Nov. 2, 1964, Ser. No. 408,117
10 Claims. (Cl. 340—324)

This invention relates to data display apparatus and, more particularly, to a cathode ray tube presentation of data stored in digital form such that operator-selected portions of the display may be emphasized, i.e., brightened, for increased visibility over the non-selected portions.

A digital data display system receives digitally encoded information from, for instance, a computer, and provides a presentation thereof, preferably in human readable form, on a screen such as the target of a cathode ray tube, in orderly fashion. The display may operate directly from the computer memory, or from an intermediate buffer, or through an analog-to-digital converter, or from some other appropriate digital source, and must be able to discriminate between the digits to be exhibited and those which it is to use internally only. The latter comprise command digits transmitted to instruct the display in the proper handling of the information digits; examples are horizontal and vertical synchronizing characters for exciting the cathode ray tube deflection circuitry, intercharacter and interword marker characters, end-of-message characters, brighten characters, etc.

In a general way, the brightening of the display of selected characters under computer control is accomplished by simultaneously varying the horizontal and vertical deflection signals to the cathode ray tube in synchronism with control of the beam intensity; the former are usually currents for the tube deflection yoke, whereas the latter is usually a potential at the tube cathode and/or grid. In the case of a display of a plurality of horizontal lines of alphanumeric characters which may be arranged in words of varying length, it is an object of this invention to provide means for intensifying one or a plurality of selected words of selected lines such that the operator may make easy reference to these, although the rest of the display is also quite readable.

It is another object of this invention to accomplish the above while minimizing operator fatigue by permitting the operator to continuously observe the display as he makes selections for brightening.

It is a further object of this invention to provide display intensification with equipment commensurate with that known in computer technology so that the display may be used as a computer input-output device.

It is another object of this invention to provide a cathode ray tube trace brightening circuit wherein the brightness remains substantially constant for its entire duration, is accurately repetitive, and is changeable as the operator desires.

The foregoing and other objects, features and advantages of the invention will be apparent from the following more particular description of a preferred embodiment of the invention, as illustrated in the accompanying drawing, a block diagram of the system.

The display unit in which the invention is utilized in its preferred embodiment, comprises a cathode ray tube and associated circuitry for driving it such that, in a display frame, 2048 alphanumeric numeric characters may be distributed in 32 lines of 64 characters each. The characters making up the frame are stored in binary form (6 bit code) in a recirculating register such as a delay line or some other cyclical storage device synchronized by a clock signal source, which generates periodic counts.

Generally, not all characters recirculating in the register are visible on the CRT face since certain characters, such as marker, brighten and space characters (to be explained), although stored in their proper places, are utilized only as control for the circuitry, thereby affecting characters which are visible. Thus, the first character in the register is a vertical synchronizing character which triggers the CRT beam vertical traverse and thus times the display frame repetitions whereas 32 horizontal synchronizing characters correspond to the 32 sweeps (lines) of a frame. A keyboard and a computer connect to the display unit in the preferred utilization.

It will be presumed in the following description that the register is filled, that is, that its 2048 character positions each have been set up with a character by the computer. The display characters (i.e., those to be made visible) are grouped into words of various lengths, successive words being separated by a space character (not visible) the display characters comprise the image seen by the operator and over which the present invention gives him control. Operation of the display unit with regard to trace brightening requires that the operator press a "marker" key on his keyboard which causes the sequential words of the display to be brightened one at a time, at a speed which is a submultiple of the repetition rate of the vertical syncing rate, the submultiple being chosen with regard to average human reaction time. When a word to be emphasized is reached, the operator releases the marker key so that the selected word remains brightened during repetitive frame periods, and then presses and releases a "brighten" key. He may now again use the marker key to seek other words for emphasis without destroying the brightening of the word previously selected. In this way, as many words as desired up to the capacity of the recirculating register may be brightened.

Also provided on the keyboard is a "line" key, which, if depressed, causes the sequential word brightening to discontinue at its place in the present line and jump to the word of the succeeding line directly below the word of discontinuance; thus, the operator need not wait for the marker to traverse a line in which he does not require intensification.

Internally, the display unit recirculating register feeds a shift register which is sampled each character period. Sampling is for the purpose of setting up a holding register which feeds a decoder and thence a matrix and serializer. The function of the holding register is to retain the character codes sufficiently long to permit serializer operation since the shift register retention of a character in its proper format is too brief for this purpose. The decoder recognizes selected character codes corresponding to the control characters: the space between characters ("S"), a special code also corresponding to the space between characters ("B"), the vertical syncing character ("V") and the horizontal syncing character ("H"), and energizes a line corresponding to each; these signals, as will be described, are used in gates of the circuitry. The decoder also recognizes the display characters and energizes lines to the matrix, one line for each character. The matrix generates a unique 120-bit code corresponding to its excited input line. The 120-bit code, serially sampled by the 120 clock counter outputs, energizes the cathode of the cathode ray tube and comprises the display information.

The marker is generated as a preselected count from a stepping counter having a capacity for 2048 counts of a frame corresponding to the 32 lines multiplied by the 64 characters. The stepping counter makes one count each character period and thus the marker is generated at the same character period of each frame period. Reset circuitry for the stepping counter causes this character period to be the first of the frame period, when the "V" character occurs. Thus, when the display unit is first energized, since the "V" character is a control character and not fed to the matrix or serializer and thus not visible, no brightening appears on the CRT. Gating circuitry and bistable state circuits are used extend the marker pulse for a time corresponding to the word length by responding to the "S" or "B" character lines of the decoder, the outputs of these components being connected to the CRT grid.

To step the marker from word to word, the stepping counter content is increased by depression of the marker key. This energizes gates at the stepping counter input with every fourth "V" character, i.e., every fourth frame period, this selection being appropriate to permit the average operator to react and decide whether or not he desires continuous brightening of the marked word. If he does so desire, releasing the marker key keeps the word intensified since its count is retained in the stepping register.

Retention of the intensification of a word is accomplished on closing of the brighten key to activate a gate which passes the "S" character (decoder output) prior to the selected word to substitute for the coding of the "S" character that for the "B" character. This "B" character coding is then fed to the CRT circuitry which provides intensification. On repetitive frames, therefore, brightening occurs from a "B" character to the next "S" character or, otherwise stated, for the duration of the word therebetween regardless of the number of characters it contains.

In order to skip the marking pulse to a next line, the operator, by pressing the line key, enters 64 extra pulses into the input gating for the stepping counter. The number 64 is established by the presence of the "H" character coding at the deccoder output; this coding occurs 64 character periods after the occurrence of every "V" character coding at the decoder output.

The block diagram of the figure is portioned into seven sections cooperating to perform as described above.

Clock section 10 includes a source of repetitive square wave signals and a counter, both designated by reference numeral 12, which generates sequential signals $B_1$ through $B_{120}$ on the indicated lines. As is known in the computer arts, each of these lines may be the output of a flip-flop triggered to its set state in its turn by the output from a square wave oscillator. Each of the signals $B_1$ through $B_{120}$ thus represents a bit period of system operation, and various of the lines carrying these signals feed into gates in the other sections; the cycle $B_1$ through $B_{120}$ is designated as a character period.

Frame information handling section 14 may be regarded as storage for the display and control characters received from the computer on line 16. As already pointed out, the computer transmits to the display system a frame of information comprising 2048 6-bit characters (which may have been entered into the computer memory through the operator's keyboard). The characters enter recirculating register 18, a bit exiting on line 20 and entering on line 22 of the recirculating path each bit (B) period. The recirculating path also includes shift register 24 which contains six stages and therefore retains the code for one character every sixth bit period, its content during the other bit periods being bits from a pair of successive characters.

At the time that the full code for a character is stored in shift register 24, it is sampled and transferred to holding register 26. The sampling is done in parallel by a set of AND gates, such as AND gate 28, on the inputs of holding register 26. Since the sampling occurs during periods $B_{100}$, it is apparent that a new character appears in holding register 26 every character period.

Decoder 30 accepts the character code from holding register 26, recognizes the code and, accordingly, energizes one of its output lines. It should be understood that the coding is unique to the character; thus, if the code corresponds to one of the display characters, lines 32, which actually comprises 60 conductors, one for each alphanumeric character contemplated by the present embodiment, is energized, but, if the code corresponds to the control characters "S" "B" "H" or "V," the appropriately labeled line is energized.

Lines 32 feed into display section 34 to energize matrix 36, a memory which converts from the incoming 1-out-of-60 code to a 120-bit outgoing code on 120 corresponding lines, such as line 38, which are sampled serially by serializer 40 utilizing the bit period counts from clock section 10 and AND gates, such as AND gate 42. The outputs of serializer 40 are fed through OR gate 44 to the cathode of tube 46 as unblanking pulses. The display characters are made visible on the screen of tube 46 by the operation of yoke drive 82 to be described.

Generation of the marker is provided by character intensification section 48 and word intensification section 50, which serially connect to the grid of tube 46. Section 48 includes eleven stage stepping counter 52, which is capable of making 2048 counts, corresponding to the illustrative display character capacity (64 characters times 32 lines), as driven by bit period pulse $B_{10}$ through OR gate 54; output line 56 is energized every 2048th count of counter 52 and, through AND gate 58 and OR gate 60 in section 50, resets flip-flop T2 at the subsequent bit period $B_2$, thereby pulsing the grid of tube 46 and starting a brightening trace at the presently received character. Flip-flop T2 remains reset until set by the output of AND gate 62, which occurs at bit period $B_1$ of the next "S" character, when line "S" of decoder 30 is pulsed. As a result, trace brightening occurs from the first character of a word (bit period $B_2$ of the first character period following a space character) to bit period $B_1$ of the succeeding space character, or otherwise stated, throughout the present word regardless of its display character content.

It should now be apparent that the count in counter 52 at the time of the "V" character (beginning of the frame period) determines the character at which brightening will start. To prevent the marker trace from emphasizing some words when the display equipment is first turned on, this count may be made zero and since the "V" character period coincides with the zero count, no marker will be visible. This is accomplished by resetting all stages of counter 52; when the ON key is pressed by the operator, differentiator 64 pulses the reset inputs of all stages of counter 52.

To step the marker from word to word, the operator depresses the marker key in character intensification section 48. Section 48 receives the signal "V" output from decoder 30 in frame information hanrdling section 14 to drive two stage counter 68; output line 70 is energized with every fourth count from counter 68. Thus, one input to AND gate 66, for the duration of every fourth frame period, is provided. A second input to AND gate 66 occurs during bit period $B_5$ of each character period. The third input is labeled $T_3$, which, referring to word intensification section 50, is seen to be the set output of flip-flop T3, activated by AND gate 58. As a result, AND gate 66 feeds shift pulses into counter 52 through OR gate 54, additional to the period $B_{10}$ pulses already discussed, each fourth frame period as long as the marker key remains depressed. The effect is that the brightened trace moves from word to word, sufficiently slowly to be observed and for the operator to release the marker key and fix the trace at a particular word if he so desires.

Since depression of the marker key after its release again deemphasizes the word previously brightened, the invention provides brighten section 72, which permits retention of the emphasis on the chosen word. Referring thereto, the operator, after releasing the marker key, depresses the brighten key, which sets flip-flop T1 and passes through AND gate 74 the bit period pulse $B_{100}$ corresponding to the "S" character (sensed by decoder 30) preceding the last brightened word, as indicated by the set state of flip-flop T3 in word intensification section 50. Coincidence of the last mentioned two factors provides an output from AND gate 76. The output of AND gate 74, on line 78, forces shift register 24, which stores the "S" character code, to convert to the "B" character code by, in this case, triggering two of its stages, the two stages being the only ones in which the state differs between the two codes. Thus, if the code for the "S" character is 000000 and that for the "B" character is 110000, only the two left-most stages of shift register 24 need to be set by line 78; this is shown in the figure. It will be recalled from the discussion of word intensification section 50 that the reset state of flip-flop T2 provides trace brightening on tube 46. The "B" character code output of decoder 30, independently of the marker generated by counter 52, excites, through OR gate 60, the reset input of flip-flop T2. Thus, replacement in recirculating register 18 of the "S" character code preceding a word by the "B" character code will cause the word to be repetitively brightened during sequential frame periods. The brightening will end with the word (i.e., at the space between it and the next word) since flip-flop T2 is set by AND gate 62, as already pointed out, at the next "S" character code output of decoder 30. It should be obvious that, since an "S" character code is entered into recirculating register 18 by the computer between all words and any and all "S" character codes may be replaced by a "B" character code, any and all words presented on tube 46 may be continuously emphasized.

Returning now to brighten section 72, flip-flop T1 is reset by AND gate 80 at bit period $B_{119}$ of the "S" character being replaced, to limit the replacement to that character only; retention of depression of the brighten key thus has no further effect as long as the marker key is not energized.

If the operator perceives that he will not require intensification of the words of a line presently being traversed by the marker, he may press the line key of line jump section 84, thereby setting flip-flop T4 at the next excitation of line 70 by counter 68. Output $T_4$ from flip-flop T4 activates AND gate 86 to pass period $B_5$ pulses through OR gate 54 to counter 52. The similarity of this activity to the effect of operation of the marker key, already discussed, is apparent. It should be noted that flip-flop T4 is reset by the "H" character output from decoder 30, and, since, as pointed out, 64 character periods elapse between the "V" and "H" character outputs from decoder 30, this number of period $B_5$ pulses will excite counter 52. As a consequence, line key depression causes the marker to travel a full line and stop at the corresponding word in the next line and, if the key is held, the activity is repeated.

Yoke drive section 82, as commonly found in the art, contains vertical and horizontal deflection circuits keyed by the "V" and "H" character outputs, respectively, of decoder 30. Deflection of the beam of tube 46 is provided in yoke drive 82 which contains the requisite deflection circuits comprising a high frequency vertical sweep generator synchronized by clock 10 and the horizontal sweep generator triggered by signal H. The sweep voltage of the former is superimposed on that of the latter to form a composite imaginary 10 by 12 character dot matrix raster, of which 64 are provided on a line of display by the vertical sweep initiated by signal V. This system of beam deflection need not be detailed further here.

The above description and the drawing are considered to be sufficient to permit one skilled in the electronic computer art to practice this invention. Its integration into a computer system, i.e., an electronic device capable of handling alphanumeric characters as combinations of "true" and "false" states in bistable circuits such as flip-flops, as bistate magnetic recordings on a magnetizable surface, as the two states of remanent magnetization of saturable core reactors, or as some other well known form (i.e., mechanization) of binary representation, is believed to be within the scope of engineering routine. For instance, although the flip-flops are shown as the R–S type, those familiar with the art will recognize that use may be made of any of the types described at pages 121 through 132 of the book Logical Design of Digital Computers, by M. Phister, Jr., Wiley & Sons, Inc., New York, 1958, wherever bistability is required, without affecting the inventive concept. Further, it is noted that the system involves the sequential operation of what has come to be recognized as computer structure, including pulse sources, AND gates, OR gates, etc., performing "logic," that is, operating synchronously to perform their functions. In this respect, it is observed that 120 bit period signals are used for timing. This choice has been directed in the embodiment by the requirements of the character presentation on tube 46 and does not dictate the sequential operation of the circuitry according to the particular bit period signals shown; in a modification of the system, it will be found most efficient to preserve the sequence of operation, despite changes in the number of bit period counts or which count energizes a particular gate.

Briefly, while the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a system for the display of information cyclically stored as digitally coded characters:

unblanking means for the display responsive to the characters to provide continuous visibility therefor; and means to provide visibility emphasis in the display, comprising:

a counter synchronized with the sequential character output from the storage and having a count output corresponding to each character;

intensification means connected to said unblanking means;

means connected to said counter to energize said intensification means with a designated output from said counter so that a character or a group of associated characters are additionally visibly emphasized;

means at the input of said count to cause therein a change in counting rate;

means connected to said counter to retain the energization of the intensification means during subsequent character outputs from the storage following the energizing count output from said counter.

2. The system of claim 1 and reset means at the input of said counter to cause the designated count to occur at a particular character output from the storage.

3. The system of claim 1 and means connected to said energization means to repeat the energization of the intensification means for the same character output from the storage during additional cycles of the storage.

4. The system of claim 1 wherein the display includes a cathode ray tube having an element responsive to the character output from the storage and an intensification element responsive to the designated output from said counter.

5. In a data display device including a cyclical register and a clock circuit, the register; for storage of binary coded characters cyclically in response to the clock circuit, the characters consisting of characters to be made visible on a cathode ray tube or the like and characters to control the format of display characters, the cathode ray tube including an element capable of generating an electron beam according to the display characters in cooperation with deflection means also responsive to the clock circuit and an element capable of modulating the electron beam according to the control characters display character emphasis means, comprising:

a decoder responsive to the output of the cyclical register and clock circuit and capable of generating an output for the beam generating element corresponding to the display characters and also an output corresponding to a control character signifying a space betwen display character groups, a counter responsive to the clock circuit and capable of counting the character content of the cyclical register and having an output energized at a particular count, gating means responsive to the output from said counter to energize the beam modulating element, means to step said counter once for each output from said decoder, and means controlled by the clock circuit to retain energization of the beam modulating element by said gating means beyond the particular count from said counter and until the succeeding space character output from said decoder.

6. A display device for binary coded information characters, some for display and some for control, arranged in words of various lengths separated by a space character for control, the words arranged in lines separated by a horizontal synchronizing character for control and the lines arranged in frames separated by a vertical synchronizing character for control, comprising:

a frame information handling section including, a register for cyclical storage of a prescribed number of characters and a decoder responsive to said register and having a first output energized by the display characters, a second output energized by the space character, a third output energized by the horizontal synchronizing character, and a fourth output energized by the vertical synchronizing character, a display section for making the characters visible, including a cathode ray tube having an electron beam generating element responsive to the first output from said decoder, and an electron beam modulating element, a yoke drive section for said cathode ray tube responsive to the third and fourth outputs from said decoder, a character intensification section including, a cyclical counter stepping at the character recirculation rate in said register and having an output at a particular count and, means responsive to the fourth output from said decoder to excite said counter at an increased counting rate, a word intensification section energized by the particular count output from said counter and de-energized by the second output from said encoder to drive the electron beam modulating element of said cathode ray tube.

7. The display device of claim 6 and a brighten section responsive to a selected second output from said decoder to excite said register so that the space character is replaced by a special space character, a fifth output for said decoder for the special space character, and wherein said word intensification section is also energized by the fifth output from said decoder.

8. The display device of claim 6 and a line jump section energized by the fourth output from said decoder and de-energized by the third output from said decoder to excite said counter to an increased counting rate.

9. The display device of claim 6 and reset means for said counter operative to provide coincidence of the particular count output and the fourth output from said decoder.

10. The display device of claim 8 and means in said character intensification and line jump sections effective to inhibit excitation of said counter by selected fourth outputs from said decoder.

References Cited

UNITED STATES PATENTS

| | | | |
|---|---|---|---|
| 2,959,349 | 11/1960 | Marsh et al. | 315—22 |
| 2,976,529 | 3/1961 | McNaney | 340—324.1 |
| 3,025,123 | 3/1962 | Klein | 315—22 |
| 3,104,387 | 9/1963 | Loshin | 340—324 |

NEIL C. READ, *Primary Examiner.*

A. J. KASPER, *Assistant Examiner.*